United States Patent [19]
Murayama et al.

[11] 3,923,621
[45] Dec. 2, 1975

[54] PROCESS FOR IRRADIATING A MIXTURE OF VINYLIDENE FLUORIDE POLYMER AND A PROPARGYL-CONTAINING CROSSLINKING AGENT AND PRODUCT THEREOF

[75] Inventors: Naohiro Murayama; Takayuki Katto; Takao Ichii, all of Iwaki, Japan

[73] Assignee: Kureha Kagaku Kogyo K.K., Tokyo, Japan

[22] Filed: June 21, 1973

[21] Appl. No.: 372,421

[30] Foreign Application Priority Data
June 23, 1972  Japan.............................. 47-62496

[52] U.S. Cl................ 204/159.17; 260/248 CS; 260/248 NS; 260/884
[51] Int. Cl. .......................... B01j 1/10; B01j 1/12
[58] Field of Search................ 260/884; 204/159.17

[56] References Cited
UNITED STATES PATENTS

| | | | |
|---|---|---|---|
| 3,414,498 | 12/1968 | Shinohara et al................ | 204/159.2 |
| 3,580,829 | 3/1971 | Lanza ................................. | 260/884 |
| 3,816,284 | 6/1974 | Kagiya et al..................... | 204/159.17 |
| 3,817,851 | 6/1974 | Atchison et al................. | 204/159.17 |
| 3,835,004 | 9/1974 | Nagiya et al................... | 204/159.17 |

*Primary Examiner*—Murray Tillman
*Assistant Examiner*—Richard B. Turer
*Attorney, Agent, or Firm*—Robert T. Tobin, Esq.

[57] ABSTRACT

This invention relates to a vinylidene fluoride resin composition which is capable of being subjected to crosslinking.

The composition according to this invention contains as the cross linking agent a propargyl radical-bearing substance.

2 Claims, No Drawings

PROCESS FOR IRRADIATING A MIXTURE OF VINYLIDENE FLUORIDE POLYMER AND A PROPARGYL-CONTAINING CROSSLINKING AGENT AND PRODUCT THEREOF

This invention relates to a vinylidene fluoride polymer composition characterized by its superior ability to crosslink under the influence of high energy ionizing radiation.

In the case of the cross linking reaction of polyvinylidene fluoride under high energy ionizing radiation in order to provide an elasticity memorial material such as a thermo-contractable tube, a relatively large amount, such as 10 Mrad or higher, of radiation must be applied to obtain the desired products sufficiently crosslinked. In this case, however, formation of double bonds and interruptions in the main chain structures may be frequently and disadvantageously encountered, resulting in inferior physical properties of the reaction products, in addition to cost increase for carrying out the reaction process.

The main object of the present invention is to provide an improved vinylidene fluoride resin composition capable of crosslinking by application of lesser amount of high energy ionizing radiation.

The inventive composition resides in the mixture of a vinylidene fluoride polymer with a crosslinking agent in the form of cyanurate or isocyanurate, having at least one propargyl radical functioning as the trifunctional radicals. This composition is properly shaped into formed products which are then crosslinked under high energy ionizing radiation. In the case of the proposed composition, the degree of crosslinking can be increased with lesser radioactive radiation for providing a superior elasticity memory performance over those attainable with exclusive use of polyvinylidene fluoride.

As the crosslinking agent, cyanurate such as tripropargyl cyanurate; dipropargyl allyl cyanurate, diallylpropargyl cyanurate or the like, or isocyanurate such as tripropargyl isocyanurate, dipropargyl allyl isocyanurate, diallylpropargyl isocyanurate or the like, or any combination thereof may be used.

These crosslinking agents are obtained by replacing part or whole of allyl radicals of known triallylcyanurate or -isocyanurate by propargyl radicals, and can be prepared by modifying the known process for the manufacture of triallyl cyanurate or -isocyanurate in such a way that the reagent allylalcohol or allyl halide is partially or wholly replaced by propargyl alcohol or propargyl halide, respectively.

The cyanurate or isocyanurate having at least one propargyl radical has no less superior mutual solubility than commonly used triallyl cyanurate or -isocyanurate with vinylidene fluoride resin, and represents rather superior crosslinking effect.

In the case of the proposed crosslinking agent, propargyl radical-bearing cyanurate or isocyanurate, the dose may be thus smaller than the conventional case of triallyl cyanurate or isocyanurate with equal amount of high energy ionizing radiation. Or conversely, the same crosslinking effect may be attained with a smaller amount of high energy ionizing radiation when equal amounts of the proposed crosslinking agent are used with the conventional one.

The term "vinylidene fluoride polymer" as used throughout this specification may denote not only vinylidene fluoride homopolymer per se, but also copolymers containing more than 50 mole % of vinylidene fluoride and the remainder of comonomer or comonomers copolymerizable therewith. As the comonomers, tetrafluoroethylene, vinyl fluoride, trifluorochloroethylene and propylene hexafluoride may be used.

The method for mixing the polymer concerned, with a specific amount of the crosslinking agent may be conventional. As an example, the mixing or compounding may be carried out by use of heated rolls or an extruder. A conventional mixer, preferably a Henschel type, may be used for this purpose. As an alternative method, the crosslinking agent is dissolved in solvent and the solution is mixed with the polymer, and then, the solvent is removed from the compounded mass by evaporation or extraction, as the case may be. Any combination of the aforementioned several known methods may also be employed.

The dosing ratio of the crosslinking agent to the polymer or copolymer may vary with kind, degree of polymerization and structure thereof, and with the amount of high energy ionizing radiation to apply. According to our experimental results, however, remarkable results may be obtained with 0.05 – 20 parts per hundred (PHR), preferably. 5 – 10 (PHR).

The compounded composition may be shaped into any desired form, such as, for instance, sheet, film, tube, yarn or the like. For such shaping process, the conditions may be similar to those used for the treatment of polyvinylidene fluoride. Caution must be directed to avoiding unfavorable effect of polymerization during the shaping or forming stage. Thus, as low as possible processing temperature and as short as possible processing period may highly be recommended.

By the plasticizing effect of the crosslinking agents recommended, the forming or shaping step may be carried into effect at a rather lower temperature. If the extrusion or injection moulding or forming method is employed, the processing temperature may generally be set to 180° – 250°C, although it varies with the melting point of the polymer or copolymer, the dose or the like condition of the crosslinking agent.

By applying high energy ionizing radiation upon the thus formed products of the composition, the crosslinking reaction is brought about. Generally speaking, beta ray and gamma ray may preferably be used as the high energy irradiation rays for the crosslinking reaction. As the irradiation dose necessary for the effective improvement of heat-resisting and/or elastic properties of the resin products, 1 – 10 Mrad, preferably 2 – 8 Mrad, may be recommended. The effective irradiation dose may naturally vary with the compounded amount of the crosslinking agent, the kind and degree of polymerization of the polymer or copolymer. With use of either excess or lesser amounts of the crosslinking agent relative to a certain specific dose of irradiation, the degree of crosslinkage will become lower than the desired value, thus there is an optimum dosing value of the agent.

With higher degree of polymerization of the polymer or copolymer used, the crosslinking effect may be realized with a smaller dose of irradiation.

After all, it can be said that the minimum dose of the irradiation depends upon the practical cases, while the judgement for the acceptable elasticity memory material can be determined by the measurement of the degree of elasticity of the final product at high temperature.

The composition according to this invention may be utilized upon properly formed material subjected to irradiation for crosslinking, as highly superior elasticity memory products, preferably in the form, such as, thermo-contractible tubes, films or the like.

The cyanurate or isocyanurate used in the present invention has, as was referred to hereinbefore, a superior mutual solubility with polyvinylidene fluoride and thus, may be advantageously used as a superior plasticizer therefor. More specifically, even in the case of the corresponding plastic products, not subjected to high energy ionizing irradiation for crosslinking, an addition of these auxiliary substances may decrease the high crystallinity of polyvinylidene fluoride, thereby making the forming and shaping steps easier. In the case of films and yarns, they become softer and pliable by the addition of the auxiliary materials.

In the following, several preferred numerical examples will be given for better understanding of the invention. In these examples, the remaining gel ratio, %, was determined by the following formula:

$$\text{the remaining gel ratio} = \frac{\text{weight of sample after extraction}}{\text{weight of sample before extraction}} \times 100\ (\%)$$

after the irradiated sample was subjected to extraction in boiling dimethyl acetamide for 4 hours.

100%-modulus at 200°C was measured by use of an instrument, "Tenshiron," Model UTM-IIIL, manufactured and sold by Toyo Sokki Kabushiki Kaisha, Tokyo.

The polyvinylidene fluoride, used was polyvinylidene fluoride powder manufactured by Kureha Kagaku Kogyo K. K., Tokyo, through the suspension polymerization process, having logarithmic viscosity $\eta_{inh}$, ca. 1.0.

EXAMPLE 1

Tripropargyl cyanurate, dipropargyl allylcyanurate, diallylpropargyl cyanurate and triallyl cyanurate were used successively as the crosslinking agent. 2g of the agent (4 PHR relative to the polymer) were dissolved in methanol, 50 g, at room temperature. Then, this solution was mixed with polyvinylidene fluoride powder, 50 g, and distilled for removal of methanol. The residue was shaped on a hot press into a sheet.

The press-shaping was carried out by preheating at 210°C for 2 minutes and hot-pressed at a pressure of 200 kg/cm² for 1 minute.

The dimensions of the shaped sheet were:

| | |
|---|---|
| thickness | 0.4 mm; |
| width | 11.5 cm; |
| length | 11.5 cm. |

The thus obtained sheet was subjected to crosslinking by irradiating it with electron rays in atmospheric conditions and by use of a resonance transformer type electron ray accelerator. The irradiation doses were set to 2, 4 and 8 Mrad, respectively.

The results are shown in the following Table 1.

Table 1

| Sample No. | Cross linking agent | Dose of cross linking agent : 4 PHR Remaining gel ratio, % | | | 100% - modulus at 200°C, kg/cm² | | |
|---|---|---|---|---|---|---|---|
| | | 2 Mrad | 4 Mrad | 8 Mrad | 2 Mrad | 4 Mrad | 8 Mrad |
| 1* | polyvinylidene fluoride without addition of cross linking agent | 0 | 0 | 0 | 0 | 0 | 0 |
| 2* | triallyl cyanurate | 14 | 29 | 57 | 0.22 | 1.2 | 3.8 |
| 3 | diallylpropargyl cyanurate | 28 | 45 | 69 | 0.65 | 1.9 | 5.6 |
| 4 | dipropargyl allyl cyanurate | 34 | 50 | 69 | 0.81 | 2.3 | 5.6 |
| 5 | tripropargyl cyanurate | 36 | 46 | 73 | 1.3 | 3.3 | 6.1 |

*Contrasts

EXAMPLE 2

Triallyl cyanurate, diallyl propargyl cyanurate, dipropargyl allyl cyanurate and tripropargyl cyanurate were used as crosslinking agents, successively, in the similar manner disclosed in the foregoing Example 1. Sheets were prepared from the compounds, each containing polyvinylidene fluoride compounded with each of said cross linking agents, 2 PHR. The dimensions of each of these sheets were:

| | |
|---|---|
| thickness | 0.4 mm; |
| width | 11.5 cm; |
| length | 11.5 cm. |

Electron rays were irradiated on each sheet under atmospheric conditions for crosslinking purposes as before. The results are shown in the following Table 2.

Table 2

| Sample No. | Cross linking agent | Dose of cross linking agent : 4 PHR Irradiation dose : 4 Mrad | |
|---|---|---|---|
| | | Remaining gel ratio, % | 100%-modulus at 200°C, kg/cm² |
| 6* | polyvinylidene fluoride without addition of cross linking agent | 0 | 0 |
| 7* | triallyl cyanurate | 22 | 0.98 |
| 8 | diallylpropargyl cyanurate | 47 | 2.0 |
| 9 | dipropargyl allyl cyanurate | 53 | 2.6 |
| 10 | tripropargyl cyanurate | 38 | 3.6 |

*Contrasts

EXAMPLE 3

Triallyl cyanurate and diallyl propargyl cyanurate were successively used as crosslinking agents and each was mixed with polyvinylidene fluoride powder in the given ratio and compounded in a Henschel blender, 1,000 r.p.m., at 80°C for 3 minutes.

Each of these compounded masses was extruded through the hot head, 210°C, into a continuous string which was then cut to chips, having 2 – 3 mm lengths. These chips were hot-shaped on a heated press (preheated at 220°C for 2 minutes and pressed under pressure for 1 minute) into a sheet, the dimensions being the same as before. The successively prepared sheets were subjected to electron ray irradiation under atmospheric conditions similarly as in the foregoing examples, for crosslinking purpose. Irradiation doses were 2 and 4 Mrad, respectively. The tested remaining gel percentages of the sheets are shown in the following Table 3.

Table 3

| Sample No. | Cross linking agent | Dose of cross linking agent, PHR | Remaining gel ratio, %** | |
|---|---|---|---|---|
| | | | 2 Mrad | 4 Mrad |
| 11 | diallylpropargyl cyanurate | 1 | 26 | 38 |
| 12 | diallylpropargyl cyanurate | 2 | 34 | 47 |
| 13 | diallylpropargyl cyanurate | 3 | 26 | 45 |
| 14** | triallyl cyanurate | 3 | 6 | 36 |
| 15* | none | — | 0 | 0 |

*Contrasts.

**These values were measured upon extractions in dimethyl acetamide at 100°C for 24 hours.

EXAMPLE 4

Tripropargyl isocyanurate and triallyl isocyanurate were used as crosslinking agents in succession. Each of the compounds included polyvinylidene fluoride added with 4 PHR of crosslinking agent. After treatment as in the similar manner shown in the foregoing Examples, sheets were prepared (0.4 mm thick, 11.5 cm width and 11.5 cm long).

These sheets were treated under atmospheric conditions and in the similar way as in the foregoing Example 1 with irradiation doses of 2 and 4 Mrad, respectively.

The remaining gel % of these crosslinked sheets are shown in the following Table 4.

Table 4

| Sample No. | Dose of cross linking agent : 4 PHR | | |
|---|---|---|---|
| | Cross linking agent | Remaining gel ratio, % | |
| | | 2 Mrad | 4 Mrad |
| 16* | none | 0 | 0 |
| 17* | triallyl isocyanurate | 23 | 46 |
| 18 | tripropargyl isocyanurate | 72 | 80 |

*Contrasts

EXAMPLE 5

Triallyl cyanurate, diallyl propargyl cyanurate and dipropargyl allyl cyanurate were used successively as crosslinking agents and treated in the similar manner as in the foregoing Example 1. These compounds contained 4 PHR of crosslinking agent and fluorovinylidene/tetrafluoroethylene copolymer, and vinylidene fluoride/vinyl fluoride copolymer, respectively, and were prepared into sheets as before.

The first-mentioned copolymer was prepared through suspension polymerization with the charging ratio 85 : 15 (wt. %) of the copolymers. The second copolymer was prepared with the charging ratio of 95 : 5 (wt. %). These copolymers were in the form of powder. $\eta_{inh}$ was measured to 1.3 and 0.98, respectively. These sheets were subjected to irradiation by electron rays in an open air atmosphere similar to Example 1. Irradiation dose was 2 and 4 Mrad, respectively. The remaining gel % of each of the crosslinked sheets is shown in the following Table 5.

Table 5

| Sample No. | Dose of cross linking agent : 4 PHR | | | |
|---|---|---|---|---|
| | Polymer | Cross linking agent | Remaining gel ratio, % | |
| | | | 2 Mrad | 4 Mrad |
| 19* | fluorovinylidene/tetra-ethylene copolymer | none | 0 | 0 |
| 20* | " | triallyl cyanurate | 11 | 47 |
| 21 | " | diallylpropargyl cyanurate | 27 | 55 |
| 22 | " | dipropargyl allyl cyanurate | 35 | 60 |
| 23* | fluorovinylidene/vinyl fluoride copolymer | none | 0 | 0 |
| 24* | " | triallyl cyanurate | 15 | 33 |
| 25 | " | diallylpropargyl cyanurate | 13 | 46 |
| 26 | " | dipropargyl allyl cyanurate | 32 | 52 |

*Contrasts

EXAMPLE 6

90 wt. parts of powder polyvinylidene fluoride were heated up to 80°C in a Henschel blender working at 1,000 r.p.m. and liquefied crosslinking agent, diallyl propargyl cyanurate, 1 wt. part, 40°C, was poured into the fluoride and the mixture was fully blended together for 3 minutes. This compound was extruded at 210°C from a head, of an extruder to form a continuous bar of 2 mm diameter which was then cut into chips of 2 – 3 mm.

These chips were extruded at 210°C from a head of a further extruder to form a continuous tube, I.D. 2.9 mm and O.D. 3.6 mm.

This tube was subjected to electron ray irradiation at a dose of 4 Mrad in the open air atmosphere in the similar manner as in the foregoing Example 1.

The remaining gel % of this crosslinked tube was measured as 38% and 10%; modulus was measured at 200°C to 1.4 kg/cm². The remaining gel % was measured upon extraction of the products in dimethyl amide, 100°C, for 24 hours.

The crosslinked polyvinylidene fluoride tube was pressurized to have an inner pressure of 0.2 kg/cm², gauge, and set within a tefron tube of I.D. 6.5 mm.

The double tube assembly was then temporarily at a speed of 50 cm/min. to 200°C from its one end to its opposite end. With this heat-up operation, the inner tube was expanded to the inside wall surface of the outer tube gradually.

Then, the heated-up and expanded inner tube was cooled down to solidify while the inside gas pressure was maintained, and the thus solidified tube was taken out from the outer tube. The thus expanded and solidified tube had an I.D. of 6.0 mm and an O.D. of 6.4 mm.

This tube was then immersed in a silicon oil bath of 220°C for 3 minutes and taken out therefrom and cast into a cold water bath. The tube was taken out and measured to have an I.D. of 3.0 mm and an O.D. of 3.7 mm, thus recovering substantially the original diametral dimensions. The axial contraction amounted to 6%.

From these experiments, it was shown that a superior elasticity-memory material in the form of a thermally contractable tube was provided.

EXAMPLE 7

Manufacture of dipropargyl allyl cyanurate

In a round bottom type flask, 500cc, with three inlets, fitted with agitator and thermometer, 24 g (0.6 mol) of sodium hydroxide was dissolved in a mixture of propargyl alcohol 127.1 g (2.27 mol) and allyl alcohol 65.5 g (1.13 mol) and thereto cyanur chloride 36.9 g (0.2 mol) was gradually added continuously in small quantities for 1.5 hours while the reaction system is kept at 25° – 30°C. Upon completion of this addition, the reaction mixture was kept at 30°C for 3.5 hours.

The reaction liquid was filtered for removal of undissolved substances such as sodium chloride and the filtrate was poured into a large quantity of cold water and the sedimented reaction products were collected by filtration. These sedimented products were dissolved in methanol and poured into cold water. The thus sedimented raw dipropargyl allyl cyanurate was recrystalized from methanol/water.

The thus obtained pure dipropargyl allyl cyanurate was white solids; m. p. 52°C. The yield after recrystallization 63%.

EXAMPLE 8

Manufacture of diallyl propargyl cyanurate

As mixed alcohol, a liquid mixture of propargyl alcohol 63.3 g (1.13 mol) and allyl alcohol 131.7 g (2.27 mol) was used and treated substantially in the same conditions as in Example 7. Treatments after the reaction were also same as before.

By the reaction, diallyl propargyl cyanurate was formed.

The recrystallization was carried out from isopropyl alcohol/water. The yield after recrystallization: 70%. m.p. 35°C.

EXAMPLE 9

Manufacture of tripropargyl cyanurate

As the alcohol component, propargyl alcohol, 190 g (3.4 mol), was used. Reaction conditions, other reaction materials and their quantities were same as in the foregoing Example 7. Treatments after the reaction were similar to those mentioned therein. In this way, tripropargyl cyanurate was obtained. The recrystallization was performed from methanol/water. Yield after recrystallization was 49%. m.p. 80°C.

EXAMPLE 10

Manufacture of tripropargyl isocyanurate

In a round bottom type, three inlet flask, 300 cc, fitted with agitator, condenser and thermometer, dimethyl formamide 73.1 g (1 mol) and potassium cyanate 27 g (0.3 mol) were charged and agitated at room temperature and propargyl bromide 24 g (0.2 mol) was introduced dropwise into the solution and cooled with water under agitation for an hour. Then, the temperature was elevated to 95°C and this temperature was maintained for 3 hours.

The liquid reaction mixture was diluted with 150 cc of benzene and the solution was filtered for removal of unsolved substances. The benzene-diluted liquid was introduced into a 6%-salt water and the benzene phase was taken out and the solvent was removed. In this way, raw tripropargyl isocyanurate was obtained. Yield : 31%. Melting point of purified tripropargyl isocyanurate : 161°C.

The embodiments of the invention in which an exclusive property or privilege is claimed are as follows:

1. A composition comprising a crosslinked mixture of
   a. a vinylidene fluoride polymer selected from the group consisting of a vinylidene fluoride homopolymer and a vinylidene fluoride copolymer comprising a mixture of more than 50 mole % of vinylidene fluoride and a comonomer copolymerizable therewith selected from the group consisting of tetrafluoroethylene, vinyl fluoride, trifluorochloroethylene and propylene hexafluoride, and
   b. a crosslinking agent, present in the range of approximately 0.05 to 20 parts per hundred of the vinylidene fluoride polymer, selected from the group consisting of tripropargyl cyanurate, dipropargylallyl cyanurate, diallylpropargyl cyanurate, tripropargyl isocynaurate, dipropargylallyl isocyanurate and diallylpropargyl isocyanurate,
   said composition having been crosslinked by irradiation with high energy radiation wherein the dosage of radiation is in the range of approximately 2–8 M rad.

2. A method of crosslinking vinylidene fluoride comprising the steps of:
   a. forming a mixture of
      1. a polyvinylidene fluoride polymer selected from the group consisting of a vinylidene fluoride homopolymer and a vinylidene fluoride copolymer comprising a mixture of more than 50 mole % of vinylidene fluoride and a comonomer copolymerizable therewith, selected from the group consisting of tetrafluoroethylene, vinyl fluoride, trifluorochloroethylene, and propylene hexafluoride, and
      2. a crosslinking agent present in the range of approximately 0.05 to 20 parts per hundred of the vinylidene fluoride polymer selected from the group consisting of tripropargyl cyanurate, dipropargylallyl cyanurate, diallylpropargyl cyanurate, tripropargyl isocyanurate, dipropargylallyl isocyanurate and diallylpropargyl isocyanurate, and b. crosslinking said mixture by irradiating said mixture with high energy radiation wherein the dosage of radiation is from approximately 2–8 M rad.

\* \* \* \* \*

UNITED STATES PATENT AND TRADEMARK OFFICE
CERTIFICATE OF CORRECTION

PATENT NO. : 3,923,621
DATED : December 2, 1975
INVENTOR(S) : Naohiro Murayama; Takayuki Katto; Takao Ichii It is certified that error appears in the above-identified patent and that said Letters Patent are hereby corrected as shown below:

Col. 6, Table 4, heading "Mrad" should read -- 4 Mrad --;

Col. 7, line 2, change "as" to -- to --;

line 3, change "to" to -- as --.

Signed and Sealed this twenty-seventh Day of April 1976

[SEAL]

Attest:

RUTH C. MASON
*Attesting Officer*

C. MARSHALL DANN
*Commissioner of Patents and Trademarks*